July 17, 1956 I. JEPSON Re. 24,181
STEAM IRON
Original Filed May 27, 1948 7 Sheets-Sheet 1
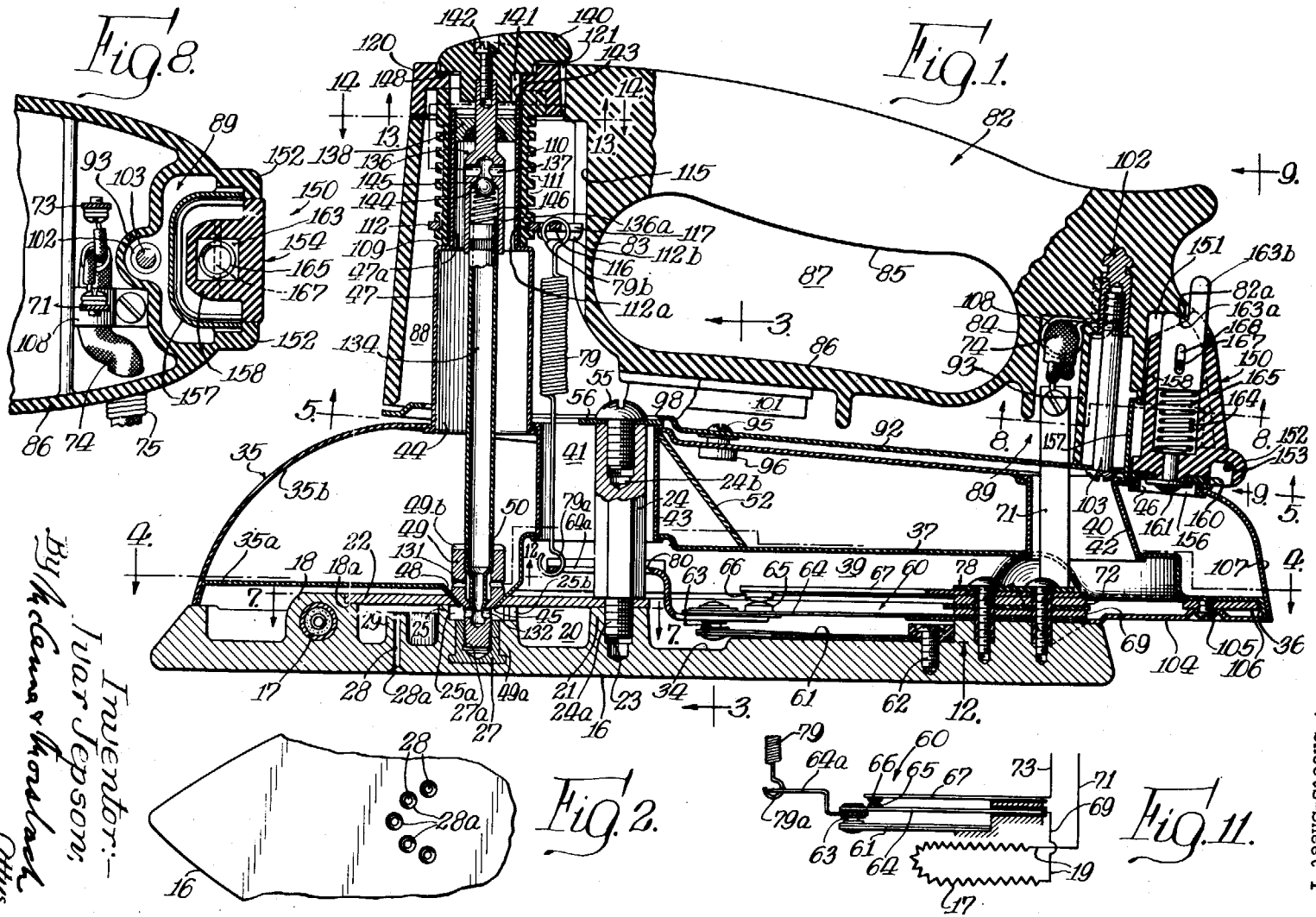
Inventor:-
Ivar Jepson,
By McCann & Horsbach
Attys.

STEAM IRON

Original Filed May 27, 1948 7 Sheets-Sheet 2

Inventor:-
Ivar Jepson;
By McCanna & Morsbach
Attys.

STEAM IRON

Original Filed May 27, 1948 7 Sheets-Sheet 3

Inventor:-
Ivar Jepson,
By McGann & Mosslach
Attys.

July 17, 1956 | I. JEPSON | Re. 24,181

STEAM IRON

Original Filed May 27, 1948 | 7 Sheets-Sheet 4

INVENTOR:—
Ivar Jepson,
BY
McCenna & Morsbach
Attys.

STEAM IRON

Original Filed May 27, 1948 7 Sheets-Sheet 5

Inventor:-
Ivar Jepson,
By McCann & Moorhead
Attys.

STEAM IRON

Original Filed May 27, 1948 7 Sheets-Sheet 6

INVENTOR.
Ivar Jepson,
BY
McCann & Horsbach
Atty's.

STEAM IRON

Original Filed May 27, 1948 7 Sheets-Sheet 7

INVENTOR.
Ivar Jepson,
BY
McCanna & Morsbach
Attys.

United States Patent Office

Re. 24,181
Reissued July 17, 1956

24,181

STEAM IRON

Ivar Jepson, Oak Park, Ill., assignor to Sunbeam Corporation, Chicago, Ill., a corporation of Illinois Original No. 2,690,623, dated October 5, 1954, Serial No. 29,461, May 27, 1948. Application for reissue December 30, 1955, Serial No. 556,772

25 Claims. (Cl. 38—77)

Matter enclosed in heavy brackets [ ] appears in the original patent but forms no part of this reissue specification; matter printed in italics indicates the additions made by reissue.

The present invention relates to steam irons and more particularly to that class of steam irons known as the flash boiler type, which include a steam generator and a valve controlled water supply.

In steam irons of this class water is fed to a steam generating chamber, preferably located in the sole plate, and at a rate which allows the water to be flashed almost instantly into steam—hence the term flash boiler type of steam iron. The generated steam is distributed to the material being ironed or steamed by means of ports or the like which communicate with the steam generator and open on the ironing surface of the sole plate. Irons of this type are usually provided with thermostatic means responsive to the temperature of the sole plate and adjustable to maintain the sole plate at a selectively controlled temperature depending upon the material to be ironed.

In irons of the type referred to above it is of course desirable that the valve for controlling the flow of water to the steam generator remain closed until the iron reaches its ironing temperature to insure flashing of the water into steam. In steam irons heretofore employed difficulty has been encountered in obtaining sufficient flow of water to the steam generating chamber after the sole plate has heated up to the ironing temperature but before the water in the reservoir has been heated substantially. It would be desirable to provide a steam iron in which proper and satisfactory flow of water to the steam generating chamber occurs as soon as the sole plate has been heated to ironing temperature so that the needle valve may be opened and the ironing operation begun.

Steam irons now available on the market are generally bulky by virtue of the water reservoir and do not present a pleasing appearance in any sense of the word. It would be desirable to provide a steam iron which is substantially of the same size as an ordinary iron while still providing a reservoir of large capacity.

In steam irons of the type referred to above it is customary to provide manual means for controlling the steam and also manual means for controlling the iron temperature. It would be desirable to provide a steam iron in which finger tip control of each of these means may be provided with the plurality of manual control means furthermore being located in substantially the same place on the iron.

Accordingly, it is an object of the present invention to provide a new and improved steam iron.

It is another object of the present invention to provide a new and improved steam iron in which a steady supply of steam is provided as soon as the sole plate is hot without the requirement of waiting until steam is produced in the reservoir, to force the water into the steam generating chamber.

It is another object of the present invention to provide a steam iron having maximum tank capacity without substantially increasing the size of the iron over that of conventional sadirons by providing a compact arrangement of the control means and the like.

Still another object of the present invention is to provide a compact arrangement of the manual control means for both the iron temperature and the steam flow.

The invention further resides in various structural improvements and innovations in the device by virtue of which efficiency and simplicity of operation are combined with low manufacturing cost and sturdiness of construction, of which structural features may be particularly mentioned the novel safety features of the iron, the ease by which it may be controlled, the novel water filling means, the compact arrangement of the thermostatic control mechanism, and the improved arrangement of various parts thereby insuring simplicity, ease of assembly, and low manufacturing cost.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

Fig. 1 is an elevational view in section with the sectional view taken on line 1—1 of Fig. 6;

Fig. 2 is fragmentary view of the bottom of the sole plate to show the steam outlet openings;

Fig. 1 shows the complete iron;

Fig. 1 shows a complete structure;

Fig. 8 is a sectional view taken on line 8—8 of Fig. 1 assuming Fig. 1 shows a complete structure;

Fig. 11 is a schematic circuit diagram of the electrical control circuit and heater unit of the steam iron of the present invention;

Fig. 19 shows a complete iron.

Figure 3:
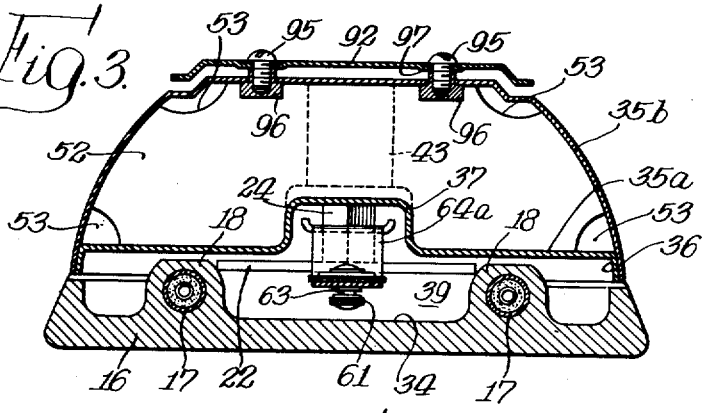
Fig. 3 is a sectional view taken on line 3—3 of Fig. 1 assuming

Referring now to the drawings there is shown an embodiment of the present invention in the form of an electrically heated pressing iron comprising a sole plate 16. The sole plate 16 is heated by an electrical element 17 which preferably is of the sheathed type. Briefly it comprises a helical resistance conductor mounted in an outer metallic sheath and supported in spaced relationship in reference to a sheath by an electrical insulating heat conducting mass formed of a suitable material such as highly compressed magnesium oxide. The heating element 17 is roughly in the shape of a hairpin as is shown in Fig. 4 of the drawings with the extremities of its legs located at the rear of the iron and its bight 17a located at the front or pointed end of the iron. The U-shaped heating element 17 is embedded in the sole plate 16, the sole plate preferably being provided with an upright rib 18 of generally U-shape (see Figs. 1, 3 and 7) in which the heating element 17 is received. As shown in Fig. 4 of the drawings the heating element 17 is provided with suitable terminals 19 projecting from the ends of the sheath.

Figures 6, 7, 9:
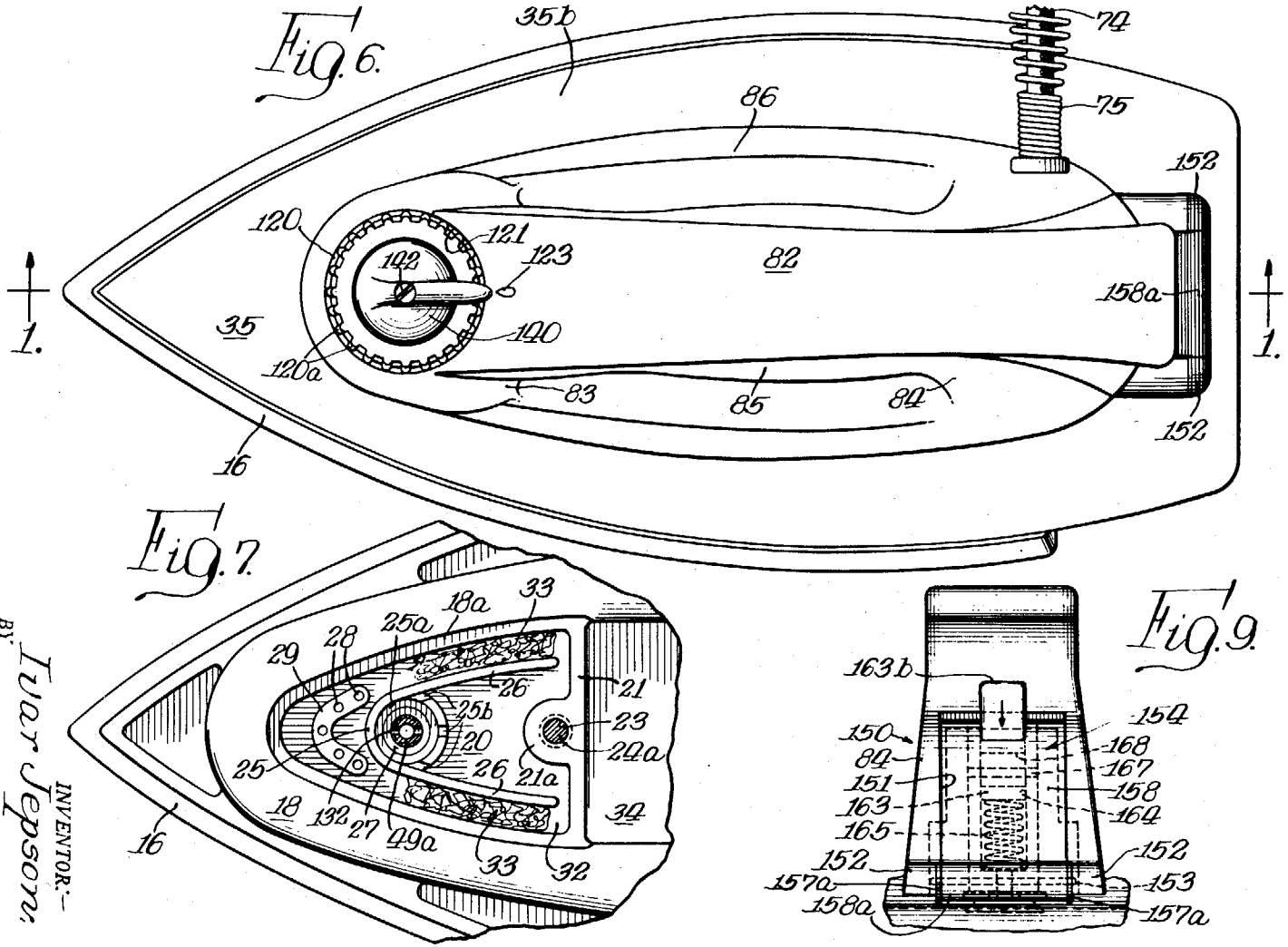
Fig. 6 is a top plan view of the steam iron of the present invention.
Fig. 7 is a top view of the front portion of the sole plate looking into the steam generating chamber and taken on line 7—7 of Fig. 1.
Fig. 9 is a partial end view looking in the direction of the arrows 9—9 of Fig. 1 and assuming that Fig. 1 shows the complete structure.

For the purpose of defining a steam generating chamber which is in close heat transfer relationship with the heating element 17 or at least with the rib 18 in which the heating element 17 is disposed, the front portion of the sole plate 16 as is best shown in Figs. 1 and 7 of the drawings is provided with a well or chamber generally designated at 20. This chamber 20 is defined within the closed end of the U-shaped rib 18 and a cross member 21 extending between the two legs of the U-shaped rib 18. The edge of the rib 18 is provided with a cut away portion defining a ledge 18a which is level with the top of the cross member 21 for supporting a suitable cover 22 for the steam generating chamber. This cover 22 is adapted to extend over the cross wall 21 which is provided with an enlarged portion 21a including a tapped opening 23 for receiving a suitable fastening member 24 in the form of a hexagonal rod best shown in Figs. 1 and 4. The rod 24 is illustrated as having a threaded extension 24a at one end for engaging the tapped opening 23 so as to provide a means for securing the cover plate 22 of the steam generating chamber to the sole plate 16. Another fastening means to be described hereinafter is also provided. The hexagonal rod 24 is of substantial length and is provided at its upper end with a tapped opening 24b, the purpose of which will become apparent as the following description proceeds.

Centrally disposed in the steam generating chamber 20 is a raised somewhat circular portion 25 forming an integral part of the sole plate 16 and having integrally formed therewith rearwardly extending legs or baffle members 26 so as to divide the steam generating chamber 20 into a series of passageways. The raised portion 25 is provided on its upper surface with a circular recess 25a exposing the upper end of a tapped bushing 27 which is integrally cast into the sole plate. The tapped opening within the bushing 27 is designated by the reference numeral 27a.

In view of the fact that the steam generating chamber is closely confined within the closed end of the U-shaped heating element 17 water supplied to the recess 25a in the raised member 25 is adapted to be substantially instantly changed into steam and to pass through suitable notches 25b formed in the wall defining the recess 25a toward the rear portion of the steam generating chamber 20. This steam, as will be described hereinafter, eventually reaches the portion of the steam generating chamber 20 nearest the front of the iron where it is adapted to enter suitable ports 28 leading to the ironing surface of the sole plate 16. To be sure that only steam can pass through the ports 28 these ports open into the steam generating chamber 20 at the top surface of a raised V-shaped member 29, also integrally formed with the sole plate 16. Consequently the ports 28 opening on the ironing surface of the sole plate 16 are arranged in a sort of V-shaped configuration. Preferably the ends of the ports or steam passageways 28 at the ironing surface of the sole plate 16 are of somewhat enlarged diameter as designated by the reference numeral 28a in Figs. 1 and 2 of the drawings. From the above description it will be apparent that in order for steam to pass through the steam passageways 28 it is necessary for the water supplied to the flash boiler type of steam generating chamber 20 to pass from the rear of the steam generating chamber around the extensions or baffles 26 through relatively narrow pasageways 32, defined between the baffles 26 and the rib 18, where if steam has not already been formed it will clearly be formed due to the close contact with the rib 18 in which the heating element 17 is embedded. To further insure the generation of moist steam the passageways 32 include a suitable means for retarding the flow of water therethrough such for example as copper wool, or the like designated at 33 in Fig. 7 of the drawings. The raised V-shaped member 29 containing the ports 28 further prevents any water from flowing through the ports 28 by trapping the same and thereby insures the supply of only steam to the enlarged outlets 28a of the steam passageways 28 on the ironing surface of the sole plate 16.

Figure 4:
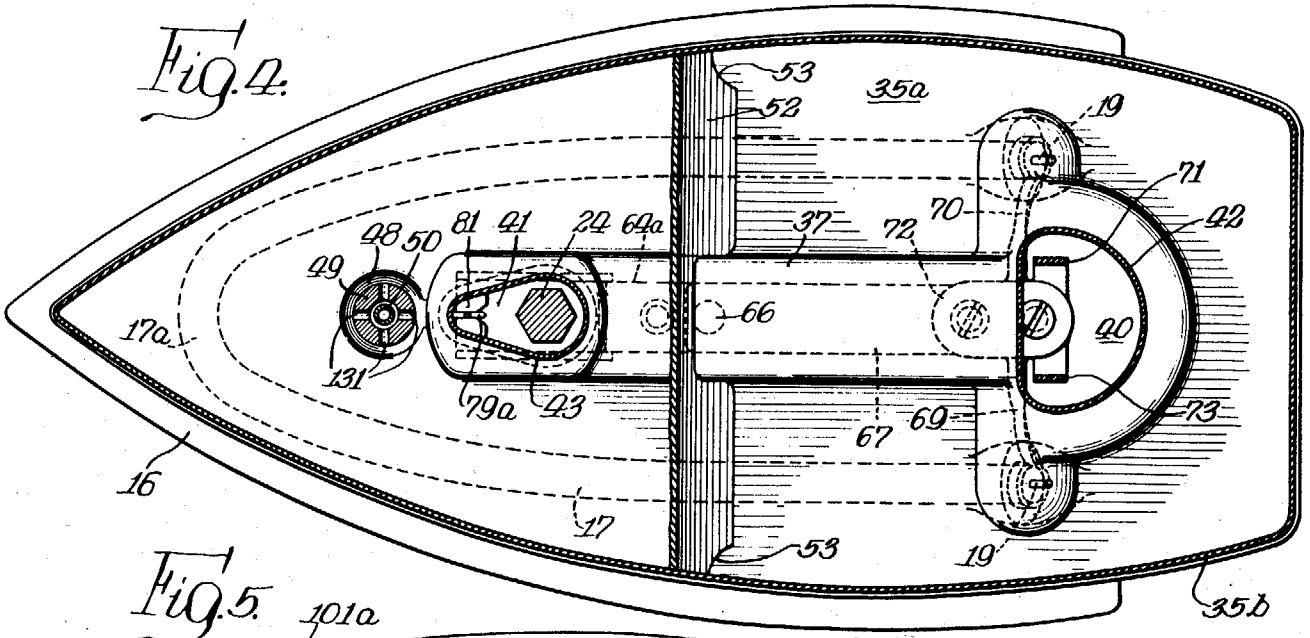
Fig. 4 is a sectional view taken on line 4—4 of Fig. 1 also assuming that Fig. 1 shows the complete iron.

To accommodate a suitable thermostatic control element the rear portion of the sole plate 16 is provided with a well generally designated at 34, best shown in Figs. 1 and 3 of the drawings, which is defined between the ribs 18 in which the heating element 17 is embedded. This well is adapted to receive a suitable control mechanism to be described hereinafter.

In order that the steam generating chamber 20 may be provided with a source of water which is flashed into steam in the steam generating chamber there is provided a water reservoir generally designated at 35 which has an external configuration which closely approaches the size and shape of conventional sadirons employed heretofore. In other words the reservoir 35 does not have such an exterior dimension as to make the steam iron appear unusually large or bulky as is the case with many prior art arrangements. On the other hand the reservoir 35 although presenting a relatively small external dimension, as will become apparent from the following description, provides a relatively large water reservoir so as to insure an ample supply of steam for a considerable ironing period. As best shown in Figs. 1, 3 and 4 the reservoir 35 preferably is formed from a pair of sheet metal stampings comprising a bottom wall 35a and a hollow cover portion 35b. The cover portion 35b is in the form of an inverted container and a substantial area of its interior surface adjacent the peripheral edge thereof is in intimate engagement with a depending flange 36 on the bottom wall member 35a. The engaging portions of the members 35a and 35b are joined as by welding, brazing or the like so as to provide a suitable water reservoir. The bottom wall 35a of the tank or reservoir 35 is also provided with a raised portion 37 which may be placed therein by a suitable stamping operation. This raised portion 37 together with the well 34 in the sole plate 16 provides a chamber 39 for a thermostatic control device to be described hereinafter.

For the purpose of permitting electrical connections and control connections to be made to apparatus disposed within the control chamber 39, the reservoir or tank 35 is provided with passageways 40 and 41 extending therethrough as is best shown in Fig. 1 of the drawings. The passageway 40 is defined by a tubular member 42 which extends through the rear end of the reservoir 35. The upper and lower ends of the tubular member 42 are sealed to the top and bottom members 35b and 35a respectively defining the reservoir 35 so as to insure a sealed tank without the danger of leakage of water therefrom adjacent the passageway 40. Similarly the passageway 41 is defined by a tubular member 43 of somewhat flattened configuration best shown in Fig. 4 of the drawings. The respective ends of the tubular member 43 are also sealed with the corresponding walls of the tank 35 in the same manner as the tubular member 42.

In addition to the passageways 40 and 41 through the tank or reservoir 35 there are also provided a series of openings in the tank 35 designated respectively by the reference numerals 44, 45 and 46 shown in Fig. 1 of the drawings. The opening 44 is defined in the upper wall 35b near the front of the iron and is adapted to receive a cylindrical steam dome 47, the lower end of which is suitably sealed as by welding or the like to the wall 35b so as effectively to provide an integral steam dome extending a substantial distance above the top surface of the reservoir 35. The opening 45 on the other hand is disposed in alignment with the tapped opening 27a in the plug 27. This opening 45 is furthermore formed at the bottom of a somewhat cone shaped indentation 48 in the bottom wall 35a of the water reservoir 35 as is clearly shown in Fig. 1 of the drawings, thereby providing a good seal between the tank 35 and a valve body 49 of a needle valve and furthermore aiding in aligning the tank 35 and sole plate 16 during assembly thereof. The needle valve comprising the valve body 49 and a needle valve member 50 is provided to control this water flow from the reservoir 35. The needle valve body 49 comprises a conical surface for engagement with the indentation 48 and further includes a threaded extension 49a adapted to engage with the tapped opening 27a. Effectively therefore the valve body 49 performs three functions; (1) it includes the valve seat for the needle valve 50 to be described in greater detail hereinafter, (2) it provides suitable means for fastening the tank or reservoir 35 to the sole plate 16, and (3) it provides a means in addition to the stud 24 for holding the steam generator cover plate 22 in the position shown in Fig. 1 of the drawings in sealing engagement with the ledge 18a and the cross wall 21. The exterior surface of the needle valve body 49 extending into the reservoir 35 is preferably of circular configuration as best shown in Fig. 4 of the drawings so as to be readily insertable through the top of the steam dome 47. Preferably the valve body 49 is provided with a screw driver engaging slot 49b whereby a screw driver inserted through an opening in the top of the steam dome 47 may be employed when assemblying the tank on the sole plate, which is done in a simple manner after the portions of the tank including the steam dome have been completely assembled. The opening 46 is provided at the rear of the reservoir 35 and effectively serves as the opening through which water is supplied to the reservoir 35. A combined filler plug and safety valve associated with the opening 46 is described in greater detail hereinafter.

It will be appreciated that during an ironing operation the iron is moved backwardly and forwardly in contact with the articles or goods being ironed. Such backward and forward motion of the iron will tend to cause the water in the water reservoir 35 to rush from one end thereof to the other. To reduce to a minimum such movement of the water and consequent splashing thereof in the reservoir 35 there is provided in accordance with the present invention a baffle plate 52 best shown in Figs. 1, 3 and 4 of the drawings. As illustrated this baffle plate extends in a diagonal manner substantially across the reservoir 35 and flow of water is permitted through openings 53 defined at the corners of the baffle plate 52. In accordance with the present invention the baffle plate 52 is disposed in an angular manner best shown in Fig. 1 of the drawings, with the upper end thereof adjacent the rear surface of the tubular member 43 and the lower edge thereof considerably to the rear of this point with respect to the iron itself. With this arrangement there is a tendency for the water in its movement due to the back and forth movement of the iron to move in a circular pattern at the forward end of the chamber and consequently prevents splashing of the water into the steam dome 47.

In addition to the needle valve body 49 which provides a means for fastening the reservoir 35 to the sole plate 16 there is provided an additional fastening means in the form of a screw 55 which engages the tapped opening 24b in the hexagonal rod or stud 24. A suitable washer 56 engageable with the upper end of the tubular member 43 serves in cooperation with the screw 55 firmly to hold the reservoir 35 to the sole plate 16. It will be noted that the hexagonal rod 24 extends through the passageway 41 defined by the tubular member 43 and the washer 56 only closes the rear portion of this passageway leaving the front portion thereof open for suitable control connections.

In order to provide means for selectively controlling and maintaining the temperature of the sole plate 16 at different predetermined desired values, there is positioned in the chamber 39 a thermostatic control device generally designated at 60. This control device 60 may comprise any suitable temperature responsive control device. So that such control device 60 may be accommodated within the relatively small chamber 39 which in turn allows for a large volume of water in reservoir 35 without increasing the outside dimensions thereof, the thermostatic control 60 has been illustrated as of the type disclosed and claimed in United States Letters Patent 2,415,795, Koci, granted February 11, 1947, and assigned to the same assignee as the present application. As illustrated the thermostatic control device 60 comprises a thermostat or bimetallic element 61 embodying the principles of the thermostat disclosed and claimed in United States Letters Patent 2,332,518, Koci, also assigned to the same assignee as the present application. The thermostat 61 is adapted to be disposed in intimate engagement with a portion of the surface defining the bottom of the well 34 in the sole plate 16. One end of the bimetallic element 61 is rigidly secured to the sole plate 16 as by means of a screw or the like 62 and suitable clamping means associated therewith. The other or relatively free end of the element 61 on the other hand is connected by means of a suitable rod or other connecting device 63 with an arm 64 supporting a contact 65 which is engageable with a contact 66 supported from an arm 67. The contacts 65 and 66 provide a switch for controlling the heat supplied to the heating element 17 as is best shown in the schematic diagram of Fig. 11 of the drawings. The conducting arm 64 supporting the contact 65 is preferably directly connected to one terminal 19 of the heating element 17 as by means of the connector 69 best shown in Fig. 4 of the drawings. The other terminal of the heating element 17 is connected to the power supply by means of the connector 70 which has a portion 71 extending through the passageway 40 defined by the tubular member 42. The switch arm 67 is also connected to a power supply by means of a suitable connector 72 and a conductor 73 which also extends through the passageway 40. The conductors 71 and 73 are adapted to be suitably connected with a power cord 74, a portion of which is shown in Fig. 6 of the drawings in a manner which will be understood by those skilled in the art. If desired a suitable spring member 75 may be provided adjacent the end of the cord fastened to the iron so as to reduce the general wear and tear of the cord at the point where it is fastened to the iron.

For the purpose of maintaining the various conductors from the heating element 17 and the switch comprising the contacts 65 and 66 in insulated relationship a stack of conductors with interspersed insulating members is provided as generally indicated at 78 in Fig. 1 of the drawings which stack simultaneously provides support and fastening means for the arms 64 and 67 in a manner well known to those skilled in the art while furthermore providing the desired electrical interconnection clearly set forth by the schematic diagram of Fig. 11 of the drawings.

With the arrangement described above it is apparent that operation of the bimetallic element or thermostat 61, which inherently includes compensating means as is fully described in the above mentioned Koci patents, causes movement of the arm 64. Preferably the arm 64 is inherently somewhat rigid so that the bimetallic element 61 must operate against a substantial force.

Figure 12:
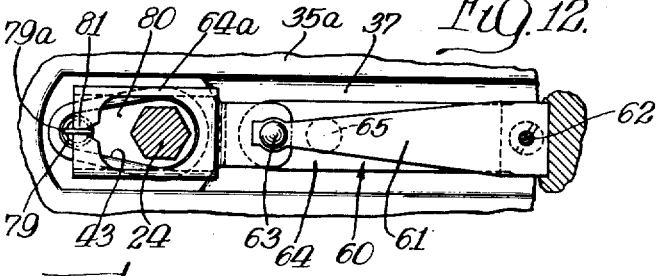
Fig. 12 is a sectional view taken on line 12—12 of Fig. 1 again assuming that Fig. 1 again shows a complete structure.

It will be understood that in modern electric irons selective control of the temperature of the sole plate 16 is desired so that different temperatures thereof may be maintained for ironing different materials such as cotton, wool, silk, rayon and the like. To provide a manually selective control of the thermostatic control device 60, the switch arm 64, which is connected to the free end of the bimetallic element 61 by the member 63, is provided with a rigid extension 64a, which extends beneath the passageway 41, including (Fig. 12) means defining an opening 80 for the hexagonal rod 24. The end of the rigid extension 64a is provided with a portion 81 of narrow cross section adapted to be engaged by the hook 79a of a coiled tension spring 79 which will be described in greater detail hereinafter. It will be apparent that by means of the tension spring 79 a force is applied to the arm or member 64 which force as will be described hereinafter is variable so as to require varying amounts of force by the bimetallic element 61 to cause opening of the switch defined by the contacts 65 and 66. The advantages of the rigid extension 64a as contrasted with the non rigid extension illustrated in Fig. 19 of the drawings will become apparent from the ensuing description.

So that an operator may manipulate the steam iron described thus far there is provided a suitable handle generally indicated at 82 preferably formed of a molded insulating material such as one of the many synthetic resins capable of withstanding relatively high temperatures in the neighborhood of 275 to 300° F. As illustrated the handle 82 is provided with a front support 83 and a rear support 84 between which extends the gripping portion 85. The gripping portion 85, and the supports 83 and 84 together with a base portion 86 of the handle 82 define the opening indicated at 87 in Fig. 1 of the drawings for the fingers of the operator. Each of the handle supports 83 and 84 is cored to provide chambers, the chamber 88 being defined in the front support 83 while the chamber 89 is defined in the rear support 84. The base portion 86 of the handle 82 which extends over a substantial part of the iron is best shown in Fig. 6 of the drawings. Essentially the handle 82 and the means of attaching the same to the steam iron described above are very similar to the arrangement disclosed and claimed in United States Letters Patent 2,277,034, Bisley, granted March 24, 1942 and assigned to the same assignee as the present application.

Figure 5:
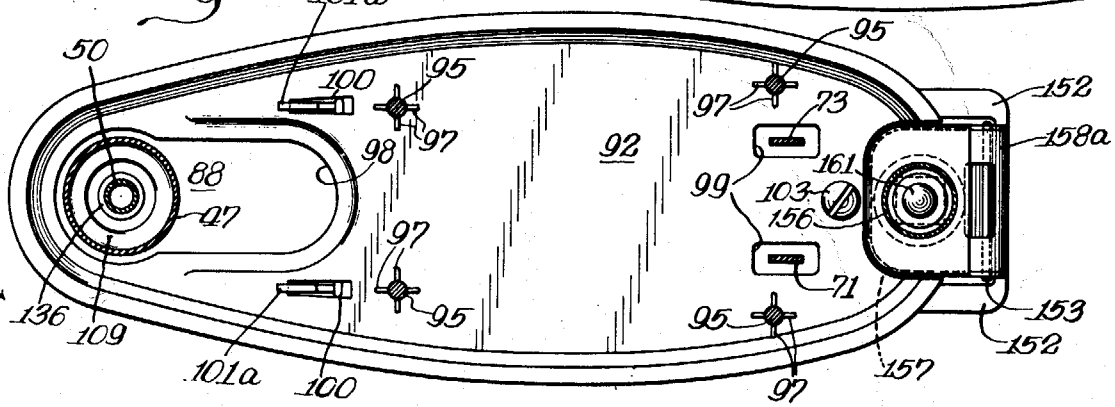
Fig. 5 is a sectional view taken on line 5—5 of Fig. 1 again assuming

In accordance with the above mentioned Bisley patent there is provided between the handle 82 and the reservoir 35 a spacer plate 92 best shown in Figs. 1, 3 and 5 of the drawings. This spacer plate 92 is spaced from the reservoir 35 so as to reduce to a minimum any heat conduction between the spacer plate 92 and the adjacent portions of the steam iron, namely the reservoir 35. Preferably the spacer plate 92 is fastened to the reservoir 35 and particularly to the upper portion 35b thereof by a plurality of screws 95, four of them being shown in Fig. 5 of the drawings. The screws 95 are adapted to engage suitable tapped openings in members 96 welded to the inside surface of the portion 35b of the tank or reservoir 35 so that no fluid from the reservoir 35 can escape through openings provided for the screws 95. In order to define a substantial space between the spacer plate 92 and the reservoir 35 the plate is provided with suitable extrusions indicated at 97 adjacent the openings therein for the screws 95 which provide the desired spacing and furthermore insure a minimum area of contact between the plate 92 and the reservoir 35 and consequently a minimum conduction of heat from the reservoir 35 to the spacer plate 92. The spacer plate 92 is provided with an opening 98 which accommodates the steam dome 47 and also permits the coil spring 79 which is disposed within the cored chamber 88 in the handle 82 to extend down into the control chamber 39. The spacer plate 92 is furthermore provided with suitable openings 99 providing passageways for the conductors 71 and 73 leading from the chamber 39 to the cored chamber 89 where connection is made with the power cord 74. It should be noted that the chamber 89 is effectively divided into two chambers by the partition member 93 depending from the handle proper, one chamber for the electrical circuit and the other for fastening means and the like. In addition the spacer plate 92 is provided with a pair of elongated openings 100 for receiving suitable hook shaped portions 101a associated with the handle 82 for fastening the handle 82 to the spacer plate 92.

As illustrated in the above mentioned Bisley patent the hooks 101a are formed on suitable inserts 101 which in turn are molded into the bottom of the handle 82. Preferably these inserts 101 are provided with suitable openings or extensions into which the material of the handle is molded so as to insure effective integral relationship between the members 101 and the handle 82. By means of the hooked shaped portions 101a which are adapted to engage with the elongated openings 100 the front part of the handle 82 may be hooked to the spacer plate 92 by inserting the hooks through the elongated openings 100 and moving the handle forwardly so that the hooked portions 101a engage the edges of the openings 100. To further fasten the handle 82 to the spacer plate 92 a suitable tapped insert 102 is molded into the rear of the handle 82 to receive the screw 103 extending through the spacer plate 92, when the handle is in the position of Fig. 1 of the drawings with the hook shaped portions 101a in hooked engagement with the elongated openings 100. In this position the head of the screw 103 is in alignment with the passageway 40 defined by the tubular member 42 so that a screw driver or other tool may readily be applied to the screw 103 through this opening. A suitable closure plate 104 is adapted to close the space between the end of the sole plate and the rear end of the reservoir 35 after the screw 103 is in place thereby providing a finished appearance and furthermore preventing the possibility of accidentally contacting the live conductors 71 and 73. The plate 104 is preferably fastened in place by suitable screws 105 engaging a plate 106 welded or otherwise secured to the bottom rear portion of the reservoir 35. It will be understood that the rear surface of the reservoir designated by the reference numeral 107 forms a part of the heel rest for the iron when not in use in a manner well understood by those skilled in the art.

The individual conductors of the power cord 74 are connected to the upper ends of the conductors 71 and 73 as is clearly shown in Figs. 1 and 8 of the drawings. A suitable strain relief member 108 preferably supports the cord 74 within the chamber 89, which strain relief is suitably supported within the handle 82.

Figure 14:
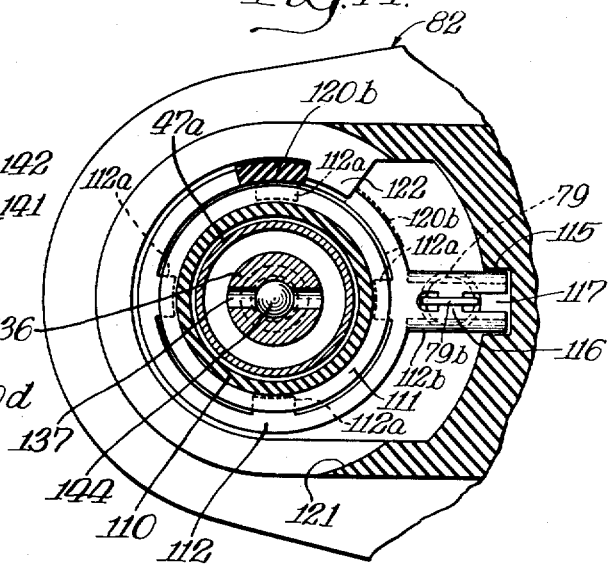
Fig. 14 is a fragmentary sectional view looking in the direction of the arrows 14—14 of Fig. 1.

From the above description it will be apparent that the cored chamber 88 in the front portion of the handle 82 accommodates the steam dome 47 as well as other control mechanism located therein such as the spring 79 for example. For the purpose of controlling the tension of the spring 79 and consequently the temperature at which the thermostat 61 operates the switch comprising the contacts 65 and 66, the steam dome 47 is provided at its upper end with a portion of reduced cross section 47a so as to define a shoulder or ledge 109. Concentrically disposed with reference to the upper end 47a of the steam dome 47 and rotatably mounted on the ledge 109 is a tubular sleeve 110 preferably formed of molded insulating material and having a cam surface in the form of a spiral groove 111 defined along its outer periphery. A cam follower in the form of an annular plate 112 is provided with extensions 112*a* at spaced points thereof (Fig. 14) for engagement with the spiral groove 111 so that rotation of the sleeve 110 relative to the upper portion 47a of the steam dome 47 causes movement of the cam follower 112 in the direction of the longitudinal axis of the sleeve 110. The cam follower 112 is provided with a lateral extension 112b which engages with a suitable recess 115 defined in the walls of the chamber 88 so as to prevent rotational movement of the cam follower 112 while still permitting free movement thereof along the longitudinal axis of the sleeve 111. The lateral extension 112b is furthermore provided with a bridge portion 116 extending across a notch 117 defined therein which bridge portion is engageable by the upper hook 79b of the coil spring 79. It is apparent that rotation of the sleeve 111 will vary the tension of the spring 79 and consequently the force applied to the extension 64a of the conducting arm 64 with the resultant control of the temperature at which operation of the switch comprising the contacts 65 and 66 occurs.

From the above description it will be understood that the arrangement for adjusting the temperature of the sole plate 16 described above permits the employment of a small chamber 39 and consequently permits a water reservoir of maximum capacity within predetermined outside dimensions. It will be noted that by employing a rigid extension 64a only a limited movement thereof is required and the force applied thereto by the spring 79 is varied by substantial movement of the cam follower 112 which is located at a place where space is not at a premium. Thus by substantial vertical movement of the cam follower 112 to vary the force on the rigid extension 64a, very limited movement of the extension 64a is required and consequently the chamber 39 need be only very small. This may be contrasted with the modification shown in Fig. 19 of the drawings where the spring is not employed and a larger chamber for the control mechanism is required.

In order that finger tip control of the position of the cam follower 112 may be had with the resultant control of the temperature of the sole plate 16, the upper end of the sleeve 110 is suitably fastened to an annular shaped control knob or button 120, which is mounted for rotation aboue a vertical axis within a recess 121 defined in the front upper portion of the handle 82, which recess 121 is effectively an extension of the chamber 88 which opens at both the upper and lower ends of the support 83. The button 120 is readily engageable at the front or sides of the iron where it overlies the handle portion as best shown in Fig. 6 of the drawings. The exterior surface of the button or control knob 120 is preferably provided wih protrusions 120a best shown in Fig. 13 of the drawings to permit ready finger manipulation thereof. The button or knob 120 is further provided with an integral downwardly extending lug 120b which cooperates with a suitable stop 122 integrally formed in the handle portion adjacent the recess 121 so as to limit the maximum movement in either direction of the control button 120 from the off position of the iron when the contacts 65 and 66 are open to the maximum heat position thereof which is the position indicated by the solid line position of the lug 120b in Fig. 14 of the drawings. The dotted line position of the lug 120b in Fig. 14 of the drawings illustrates the off position of the iron, when insufficient tension is supplied to the spring 79 so that the rod 64 together with the inherent force of the bimetallic element 61 moves the switch comprising the contacts 65 and 66 to the open position. The knob 120 may be provided with suitable indicia such as "Off," "Rayon," "Silk," etc. which respective indicia cooperate with a suitable index mark such as 123 formed on an adjacent part of the handle 82. When a particular indicia is opposite the index mark 123 the iron is set for the particular control indicated thereby.

It will be apparent that the knob 120 must be related to the sleeve in a predetermined manner so that proper operation of the controls results. To permit the necessary calibration or adjustment the button 120 is provided with a depending flange 120c which is provided on its inner surface with a saw-toothed configuration indicated at 120d in Fig. 13 of the drawings. A portion only of the outer periphery of the upper end of the sleeve 110 is also provided with a cooperating saw toothed surface whereby these saw tooth surfaces may be interlocked in various relative positions to insure the desired calibration. It will be understood that the sleeve 110 can not be provided with a saw-toothed surface for the entire circumferential area since otherwise this would interfere with the movement of the lug 120b. However, the arrangement illustrated provides the necessary relative adjustment of the button 120 and the sleeve 110 to insure that the particular operating characteristic represented by the indicia opposite the index mark 123 is obtained. Any suitable means for holding the button 120 and the sleeve 110 together as a unitary structure may be employed.

In order manually to control in a selective manner the flow of water from the reservoir 35 to the steam generator 20 by means of the needle valve comprising the valve body 49 partially described heretofore and the needle valve member 50, the latter is an elongated member extending upwardly along the axis of the steam dome 47. The lower end of this member 50 is tapered in the form of a conventional needle valve and is threadedly engaged with the valve body 49 so as to effectively provide a needle valve control with the flow of water being along the external surface thereof. The valve body 49 is preferably provided with a plurality of substantially horizontally disposed passageways 131 through which the water from the reservoir 35 may enter the needle valve and flow along the exterior surface of the needle valve member 50. It will be understood that rotation of the needle valve member 50 in one direction will completely shut off the flow of water from the reservoir 35 to the steam generating chamber 20 in a conventional well-understood manner. On the other hand rotation of the needle valve member 50 in the other direction will permit variable amounts of water to flow to the steam generating chamber 20 depending on the amount of rotation. The valve body 49 further includes a passage 132 which permits water flowing through the needle valve to pass into the recess 25a in the steam generating chamber 20.

In accordance with the present invention there is provided a passageway interconnecting the upper end of the steam dome 47 and the steam generating chamber 20 independently of the passageway afforded by the needle valve per se. This passageway may be a passageway separate and distinct from the needle valve member 50 as is disclosed in Fig. 19 of the drawings, or may comprise a passageway 134 within the needle valve member 50 itself, as is shown in Fig. 1 of the drawings and as is specifically disclosed and claimed in a copending Vieceli application, Serial No. 29,542 filed concurrently with the present application and assigned to the same assignee as the present application and now Patent No. 2,618,875 issued November 25, 1952. As illustrated in Fig. 1 of the drawings the upper end of the needle valve member 50 is telescopically related with a fitting 136, comprising a tubular member which extends out of the upper end of the steam dome 47 into the central opening of the annular button 120. The fitting 136 is suitably fastened to the upper end of the member 50 and includes a lower tubular portion 136a connected by passageways 137 with the space within the steam dome 47. In order to prevent the escape of steam from the upper end of the steam dome it is closed by a suitable plug 138 threadedly engaging the steam dome and including a suitable packing around the fitting 136 which extends through the plug 138. In accordance with the present invention a steam control button 140, preferably formed of moldable insulating material, is disposed within the recess of the annular button 120 and attached to the fitting 136 by means of a screw 142 inserted through the top of the button 140 and threadedly engaging a tapped opening in the top of the fitting 136. With this arrangement the control button 140 for the needle valve and the control button 120 for the thermostat mechanism are concentrically disposed and are readily adapted for fingertip control. The steam control button 140 is provided with a suitable extension which is preferably opposite the index point 123 in the "off" position. The single index mark 123, by virtue of the concentric arrangement of the buttons or control members 120 and 140 provides the reference for each control. Preferably a spring washer 148 interposed between the buttons 120 and 140 maintains the latter in position.

Figure 13:
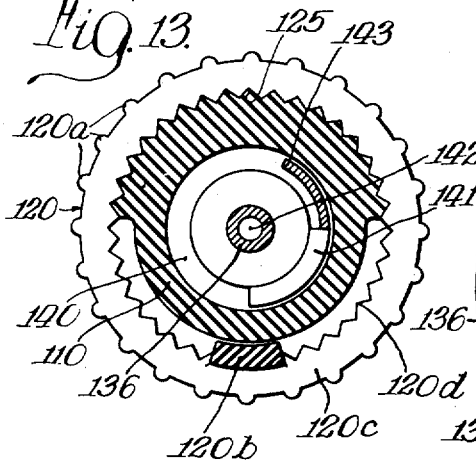
Fig. 13 is a sectional view taken on line 13—13 of Fig. 1 assuming that Fig. 1 shows a complete structure.

In order to limit the open and closed positions of the needle valve member 50 the control button 140 is provided with a depending lug 141 which engages with a stop 143 illustrated as comprising an integral extension at the upper end of the steam dome 47 as is best shown in Figs. 1 and 13 of the drawings. One extreme position, namely the closed position of the button 140 is shown in Fig. 13 of the drawings.

Figure 19:
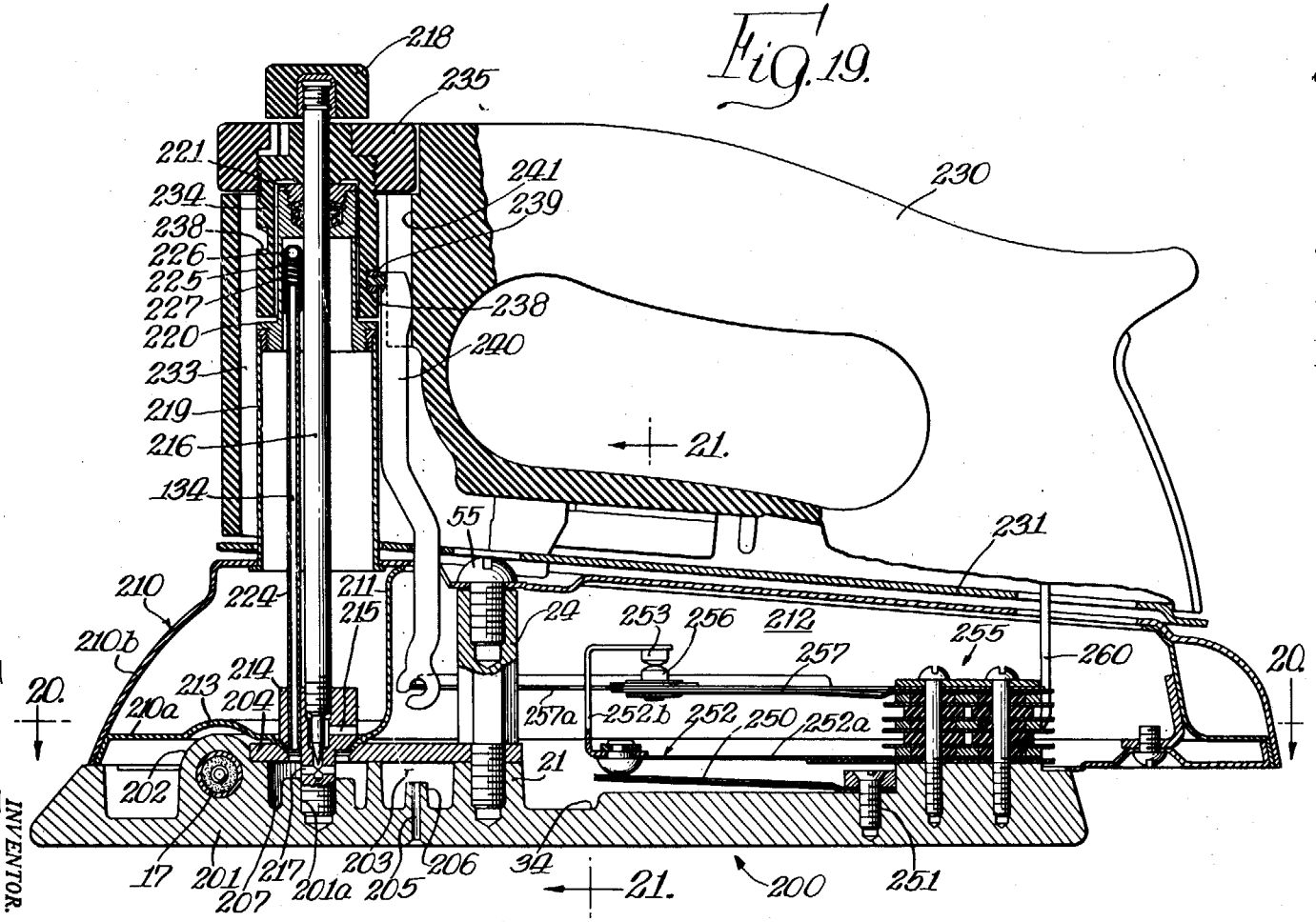
Fig. 19 is a partial sectional view in elevation, somewhat similar to Fig. 1, showing a modification of the steam iron of the present invention.

In accordance with the present invention there is provided in the passageway 134, which may be a separate passageway as shown in Fig. 19 of the drawings, a spring biased ball valve 144 normally biased against a seat 145, so as effectively to isolate the passageway 134 from the passageway 137, by the coiled spring 146. Preferably the ball valve 144 is adjusted so as to require approximately 1½ lbs. of pressure per square inch within the steam dome 47 to open the same. With this arrangement it has been found that satisfactory flow of water to the steam generating chamber 20 is assured as soon as the sole plate is hot enough for ironing purposes. The reason for this is that a certain amount of air is always trapped within the water reservoir 35 and, as soon as initial heating of the sole plate 16 occurs, there results an expansion of this air and the creation of some pressure, thus providing a positive pressure feed for the water in the reservoir 35 in addition to the normal gravity feed which exists by virtue of the position of the reservoir 35 relative to the sole plate 16. A small pressure is built up immediately upon heating of the sole plate to assure constant water flow and when this pressure attains the value of approximately 1½ lbs. per square inch the valve 144 moves to the open position. It will be apparent that this arrangement effectively provides a safety valve for the water reservoir 35.

For the purpose of providing an additional safety device there is associated with the water reservoir 35 described above a combined safety valve and filler plug generally designated at 150 and best shown in Figs. 1, 5, 8, 9 and 10 of the drawings.

In accordance with the present invention the combined safety valve and filler plug 150 is disposed within a recess generally designated at 151 defined within the rear of the handle 82, so as to be not only substantially concealed from view to provide a very pleasing appearance, but furthermore is also completely out of the way so as not to interfere in any way with the ironing operation.

Referring now specifically to Figs. 1, 5, 8, 9 and 10 of the drawings it may be noted that the recess 151 is of somewhat rectangular configuration defined within the molded handle 82. Adjacent the bottom of this recess 151 and toward the rear of the handle 82 there are provided a pair of ears 152 which are preferably formed integrally with the handle 82. The opening 46 into the reservoir 35, described above, is surrounded by an annular member 156 which provides a seat around the opening 46 for a suitable filler plug forming a part of a combined closure and safety valve assembly generally indicated at 154. It will be understood that any suitable means for supporting the assembly 154 in the recess 151 may be employed. By way of example a pivotal support is illustrated in the drawings. The annular member 156 includes an integral upwardly extending portion 157 closed on all sides except the side extending to the rear of the iron, which serves somewhat in the manner of a funnel or guard to guide the flow of water into the reservoir 35 during the filling operation. This portion 157 includes a pair of rearwardly extending ears 157a aligned with the ears 152 and defined within the ears 157a are elongated slots 157b for receiving a pivot pin 153. The elongated slots 157b shown in Fig. 10 of the drawings extend in a vertical direction for a purpose to be described hereinafter.

Figures 10, 15, 16, 17, 18:
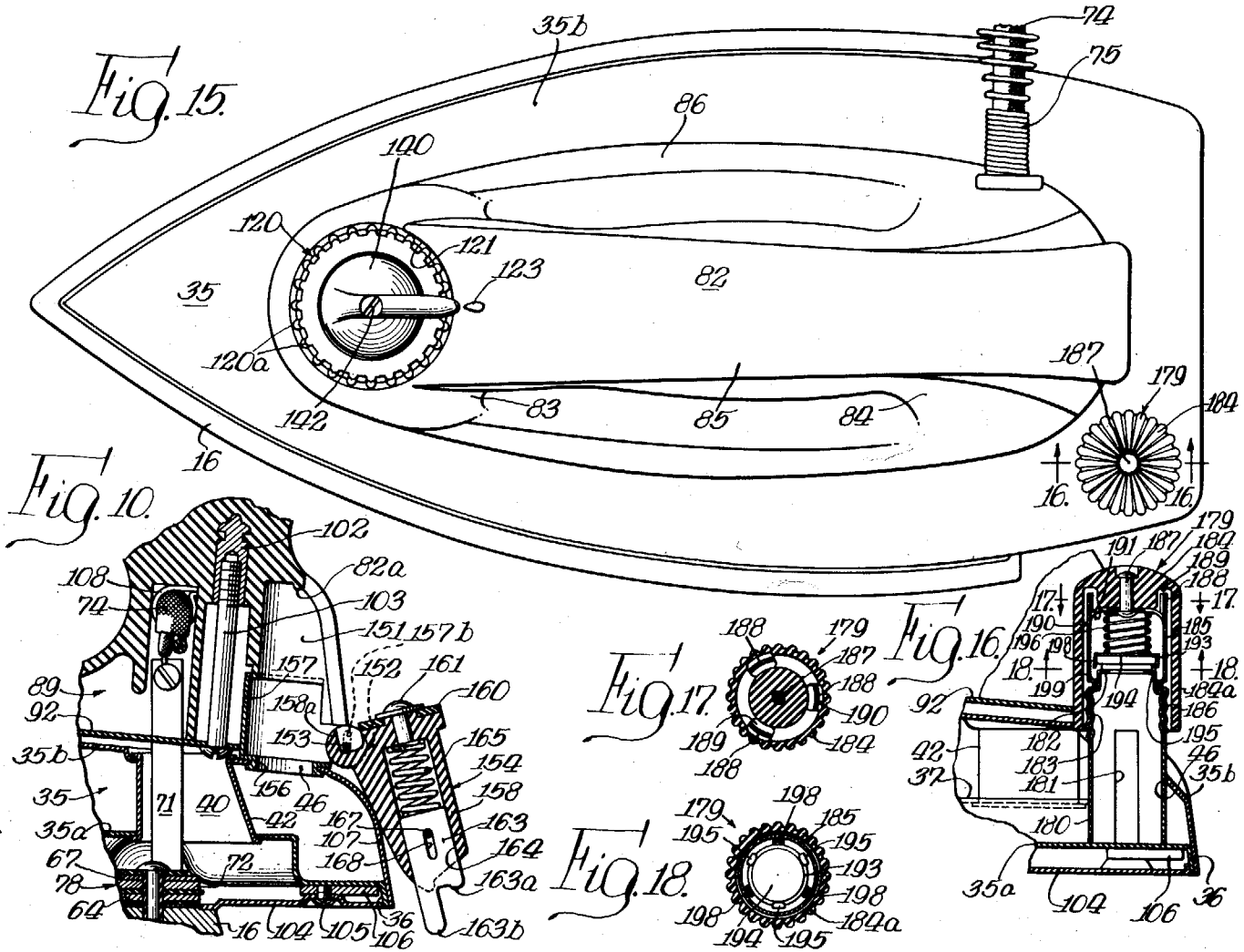
Fig. 10 is a partial view of Fig. 1 showing the open position of the water filling device.
Fig. 15 is a top plan view of the steam iron of the present invention illustrating a modification of the filler plug and safety valve of the present invention.
Fig. 16 is a sectional view taken on line 16—16 of Fig. 15.
Fig. 17 is a sectional view taken on line 17—17 of Fig. 16 assuming that Fig. 16 shows a complete structure.
Fig. 18 is a view similar to Fig. 17 taken on line 18—18 of Fig. 16.

The assembly 154 comprises a pivotal housing member 158 including a portion 158a disposed between the ears 157a and having an opening for the pivot pin 153 whereby the assembly 154 is pivotally supported for movement between the positions shown in Figs. 1 and 10 of the drawings. To simplify the drilling operation for the opening in the portion 158a to receive the pivot pin 153 only the ends of the portion 158a are solid. A suitable sealing gasket 160 is riveted as indicated at 161 to the bottom of the pivotal housing member 158. When the closure device 154 is in the closed position shown in Figs. 8 and 9, the gasket 160 is biased by means to be described hereinafter into sealing engagement with the valve seat or annular member 156 surrounding the opening 46.

In order to hold the closure member 154 in the closed position shown in Figs. 1 and 9 there is provided a spring biased plunger 163 which is reciprocally mounted in a recess 164 defined in the pivotal housing member 158. A suitable compression spring 165 disposed within the recess 164 biases the plunger 163 in an upward direction as viewed in Fig. 1. A suitable pin 167 extending through a slot 168 in the plunger 163 limits the upward movement of the plunger 163 but at the same time permits limited reciprocal movement thereof. The pin 167 engages with the walls defining the recess 164 in the pivotal housing member 158.

The upper end of the plunger 163 is provided with a notch 163a to receive therein an extension 82a of the handle 82 which effectively acts as a lock or a latch maintaining the closure assembly 154 in the latched position shown in Fig. 1 of the drawings under the bias of the spring 165. The plunger 163 includes a manually actuable portion 163b which is substantially the only portion thereof protruding beyond the confines of the handle 82. This portion or extension 163b is readily actuable by simple finger manipulation to release the latch whereupon the closure assembly 154 may be moved to the position shown in Fig. 10 of the drawings. It will be apparent that by virtue of the elongated slots 157b in the ears 157a that the closure assembly described above will act as a safety valve since a substantial increase in pressure within the reservoir 35 will cause the closure member to move bodily the entire assembly 154 and particularly move the gasket 160 out of sealing engagement with the annular member 156 which movement is furthermore permitted by virtue of the limited movement of the plunger 163 relative to the member 154 against the bias of the spring 165. Since the escaping steam or hot water through the safety valve mentioned above will be directed to the rear of the steam iron the danger of the operator coming into contact with the hot fluid is nil. The spring 165 is preferably designed so that the safety valve opens when the steam pressure reaches twenty-five pounds per square inch.

The handle portion defining the recess 151 is designed to overlap the portion 157, as is clearly shown in Figs. 1 and 10 of the drawings, to prevent water during the filling operation from entering the chamber 89. During the assembly of the iron the closure assembly 154 is pivotally mounted to the ears 157a by the pin 153 before the handle 82 is put into position.

It will be understood that although the concealed position of the combined filler plug and safety valve is preferable it might assume various other positions and in Figs. 15, 16, 17 and 18 of the drawings there is illustrated a modification of the combined filler plug and safety valve of the present invention which is generally designated as 179. The corresponding parts of Figs. 15 to 18 inclusive are designated by the same reference numerals as the preceding figures of the drawing. From the disclosure of Figs. 15 and 16 it may be observed there there is disposed in the opening 46 adjacent one of the rear corners of the reservoir 35 a filler tube 180 which extends to the bottom of the reservoir and is suitably sealed to the edges thereof. In order to control the amount of water supplied to the reservoir 35 through the filler tube 180 this tubes extends to the bottom of the water reservoir 35 and is provided with an elongated slot 181 interconnecting the tube 180 with the reservoir 35. It will be understood that the amount of water which can be supplied to the reservoir 35 is controlled by the height of the slot 181. As long as the level of the water within the reservoir 35 is below the top of the slot 181 air within the reservoir may escape as it is displaced by the water. However, once the water level reaches the top of the slot 181 it is no longer possible for the air to escape and consequently the upper end of the slot 181 determines the amount of water which can be poured into the reservoir 35. Preferably the length of this slot 181 is adjusted so that the amount of water which can be supplied to the reservoir 35 is not sufficient to run out of the needle valve when the iron is placed upon its heel 107. Consequently when the person using the iron sets the iron up on its end, in the conventional manner, the flow of water to the steam generating chamber stops without the necessity of manipulating the steam button 140. The upper end of the filler tube 180 is provided with a circumferential flange 182 to provide a valve seat for the combined filler plug and safety valve 179 to be described in greater detail hereinafter. Also the tube 180 is provided with a rolled thread 183 near the upper end for threadedly engaging the filler plug 179.

The combined filler plug and safety valve 179 comprises an outer housing 184 of insulating material, having a depending skirt 184a adapted to extend over the tubular member 180. The exterior surface of the housing 184 is preferably of some suitable configuration, such as being provided with suitable molded protrusions, to permit ready finger manipulation thereof. Disposed within the insulating housing 184 is a tubular metal cover member 185 having the lower end thereof provided with a rolled thread 186 cooperating with a rolled thread 183 of the filler tube 180. The metal cover member 185 is essentially a cup shaped member which is inserted in the insulating housing 184 and held in position by means of a rivet 187. To prevent relative rotation between the insulating housing 184 and the metal cover member 185 a plurality of punched out portions 188 of the metal cover member best shown in Fig. 17 of the drawings are adapted to extend into recesses 189 defined in the insulating housing 184. These recesses 189 are furthermore connected to passageways 190 defined in the insulating housing 184 which are steam escape passageways for the safety valve to be described hereinafter. The steam can escape through the openings 191 formed in the metal cover 185 by virtue of punching out the extensions 188, and the recesses 189 are sufficiently large to permit steam to flow around the extensions 188 into the passageways 190. It will furthermore be apparent that escaping steam due to the operation of the safety valve will be in a downward direction by virtue of the depending skirt 184a and consequently cannot come into contact with the operator holding the handle 82.

A suitable stop is provided to limit the closing movement of the metal cover member 185 relative to the filler tube 180 which stop in the illustrated embodiment is provided by the ends of the rolled threads 183 and 186. In order to provide a combined safety valve and closure member for the filler tube 180 there is provided an inverted cup-shaped valve member 193 for receiving a resilient washer or gasket 194. A plurality of punched-out portions 195 of the valve member 193 are provided to hold the gasket 194 in position relative to the valve member 193. A suitable spring 196 is provided to bias the valve member 193 so that the gasket or sealing member engages the valve seat 182. It will be apparent that with the arrangement described a suitable closure member for the filler tube is provided. A safety valve is also provided since the closure member is closed to the same position each time by virtue of the stop referred to above. In order to prevent the spring 196 from moving the valve member 193 out of the metal closure 185 when the filler plug 179 is removed from the filler tube 180, a plurality of lugs 198 are punched out from the valve member 193 which are adapted to engage a ledge 199 defined in the metal cover 185. These lugs 198 extend away from the axis of the valve member 193 by a small angle which permits ready assembly of the spring and valve member, but once the valve member has been pushed into position the lugs 198 prevent the valve member from moving beyond the position where the lugs 198 engage the ledge 199.

From the above discussion it is evident that the steam iron described is simple to manufacture and relatively easy to assemble. It will be apparent that the water reservoir together with the steam dome provides one subassembly while the sole plate and steam generating chamber cover provides another subassembly. The thermostatic control mechanism 60 is assembled to the sole plate 16 after which the steam generating chamber is assembled to the sole plate by means of the screw 55 and the needle valve body 49, the latter being manipulated by a suitable tool inserted through the opening at the upper end of the steam dome 47. Following this the spacer plate 92 is adapted to be fastened to the reservoir 35 by means of the four screws 95 referred to above. At the same time the cam sleeve 110 together with the cam follower 112 and the needle valve control except for the control button 140 can be assembled. Following this the handle 82 is applied to the spacer plate 92 by first causing engagement of the hooks 101a with the openings 100 and the subsequent application of the screw 103 while the plate 104 is removed. Electrical connections with the power cord 74 are completed prior or concurrently with the last mentioned operation whereupon the cover plate 104 is applied to the iron. The control knobs or buttons 120 and 140 can now be positioned so as to provide the correct calibration for each control.

In view of the detailed description included above the operation of the steam iron of the present invention will be apparent to those skilled in the art. By virtue of the passageway 134 a small pressure not exceeding about 1½ lbs. per square inch is provided within the reservoir 35 to insure the flow of water between the reservoir 35 and the steam generating chamber 20. Furthermore a pressure is available in the reservoir as soon as the sole plate 16 is hot enough to begin the ironing operation and it is unnecessary to wait for steam to form within the water reservoir 35. The compact arrangement of the controls for both the iron temperature and the steam flow permit easy adjustment in any desired manner by the operator while at the same time providing the iron with a very pleasing appearance. The combined safety valve and filler plug insures absolute safety and by means of the filler plug arrangement described the iron can only be filled to the desired amount. Furthermore exhaust steam due to operation of the safety valve is prevented from contacting the operator.

Figure 20:
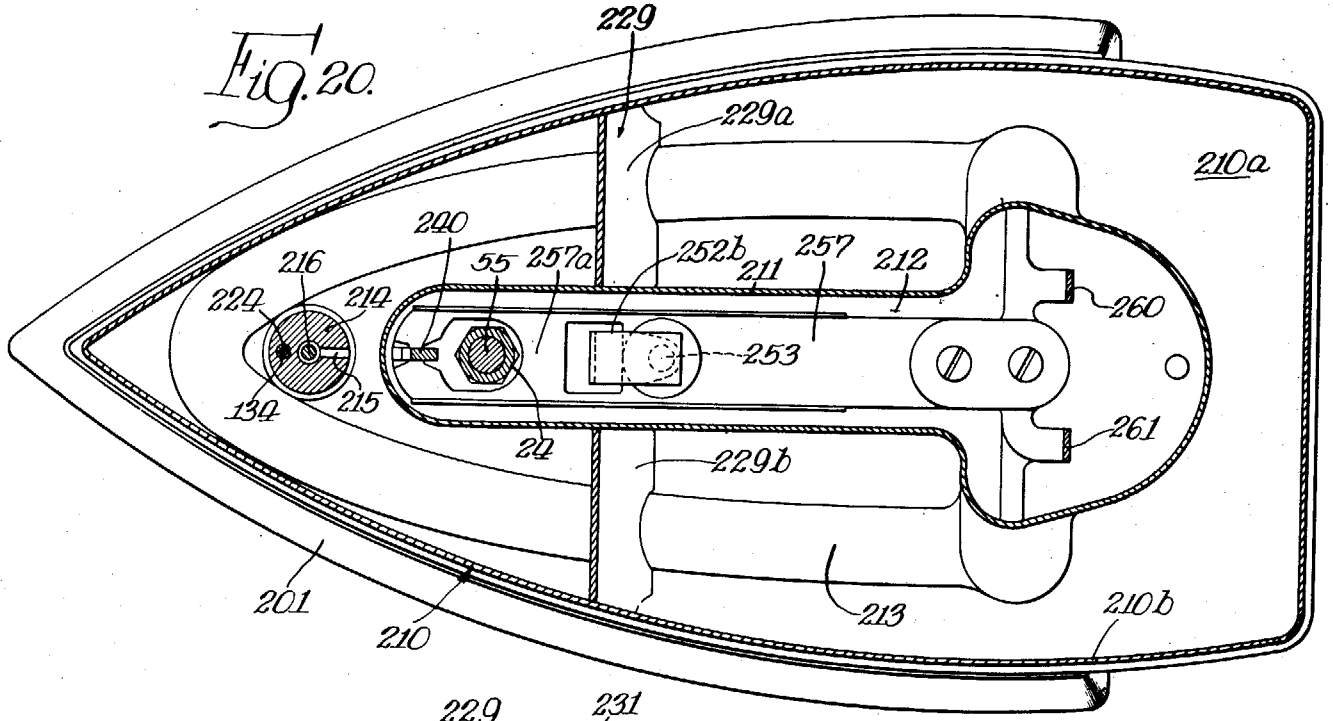
Fig. 20 is a sectional view taken on line 20—20 of Fig. 19 assuming
Figure 21:
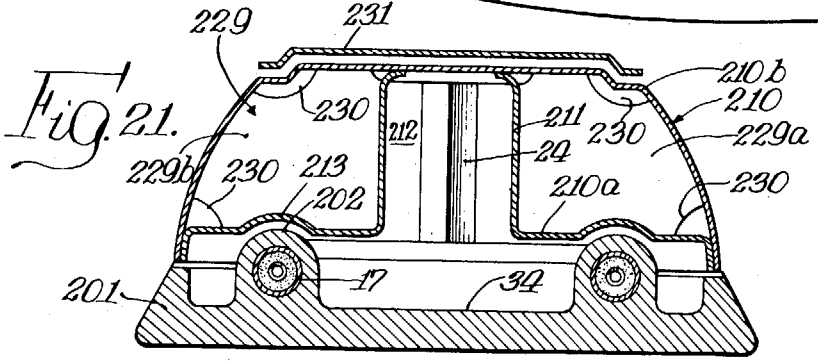
Fig. 21 is a sectional view taken on line 21—21 of Fig. 19.

There has been described above what is at present considered to be a preferred embodiment of the present invention. In Figs. 19, 20 and 21, however, there is illustrated a modification of the invention which includes many features of the steam iron described above. Various constructional details thereof, however, are different.

Referring now to Figs. 19, 20 and 21 there is illustrated a steam iron generally designated by the reference numeral 200. The parts of the steam iron 200 which are identical with the parts of the preceding figures are designated by the same reference numerals as in the preceding figures. The steam iron 200 comprises a sole plate 201 which includes a U-shaped rib 202 in which is embedded the heating element 17. A steam generating chamber generally designated at 203 is defined adjacent the bight of the U-shaped rib 202. The top of the steam generating chamber 203 is closed by means of a cover member 204 which functions in exactly the same way as the cover member 22 described above. In the arrangement shown in Fig. 19 a path is provided for the flow of steam from the steam generating chamber 203 to the ironing surface of the sole plate through passageways 205 which open into the steam generating chamber 203 at the top of a raised rib 206. The steam ports or passageways 205 in Fig. 19 of the drawings are to the rear of a circular recess 207 into which water is permitted to flow to be flashed into steam, rather than to the front of this portion of the device designated as 25a in Fig. 1 of the drawings as is the case in the preceding disclosure. The rear portion of the sole plate 201 includes a well 34 identical with the well described in Fig. 1 of the drawings for receiving a suitable control mechanism to be described hereinafter.

Suitably mounted on the sole plate 201 is a reservoir 210 comprising a bottom portion 210a and an upper inverted cup-shaped portion 210b which portions are welded or brazed together in a manner to provide a somewhat distorted toroid shaped water reservoir, the distorted toroid shape being formed by virtue of the raised central portion 211 of the bottom 210a to define a chamber 212 of substantial size for the control mechanism to be described hereinafter. The bottom 210a of the reservoir 210 is also provided with a raised indentation 213 to conform with the rib 202 of the sole plate 201.

The cover 204 for the steam generating chamber 203 and the reservoir 210 are fastened to the sole plate 201 in the same manner as was described in the preceding figures. In addition to the stud 24 and the screw 55 there is provided a needle valve body 214 which is illustrated as engaging directly with a tapped opening 201a defined in the sole plate 201. The needle valve body 214 includes a passageway 215 whereby water from within the reservoir 210 may enter the valve body 214 to be controlled by the needle valve member 216 which is of conventional construction. Suitable passageways 217 are also provided in the needle valve body 214 to permit the water to flow through the needle valve and into the circular recess 207. The needle valve member 216 extends upwardly a sufficient distance and has fastened to the upper end thereof a suitable steam control button 218 for ready manual control of the water flow and consequently the steam flow.

As in the preceding figures the reservoir 210 is connected to a steam dome 219 concentrically arranged with the valve member 216 which steam dome includes a portion of reduced cross section which defines an annular shoulder 220. The needle valve member 216 extends out of the upper end of the steam dome 219 which is closed by a suitable closure member 221, with suitable packing means being provided around the member 216 to prevent the escape of steam. The steam dome 219, instead of being a unitary structure as in the preceding figures, is formed of two parts so as to provide a larger opening to afford access to the needle valve body 214 during the assembly operation of the sole plate 201 and the reservoir 210.

In accordance with the present invention the steam iron 200 is also provided with an independent by-pass or passageway 134 connecting the upper end of the steam dome 219 with the steam generating chamber 203. As illustrated the passageway 134 is defined by a tubular member 224 which is supported within the valve body 214 in a manner so that the lower end thereof opens directly into the steam generating chamber 203 as is clearly shown in Fig. 19 of the drawings. The upper end of the tube 224 preferably includes a fitting 225 within which are disposed a ball valve 226 and a spring 227. The spring 227 is preferably designed to maintain the ball 226 in a position to seal the passageway 134 until the pressure within the steam dome 219 attains a value of the order of one and one-half pounds per square inch. It will be apparent that although the constructional details of the by-pass including the passageway 134 differ somewhat from the arrangement disclosed in Fig. 1, the arrangement functions in exactly the same manner as the arrangement in Fig. 1.

As in the preceding disclosures a suitable baffle plate 229 is provided within the reservoir 210, which baffle plate actually comprises two portions 229a and 229b by virtue of the somewhat toroidal configuration of the water reservoir 210. This baffle plate is provided with suitable cut away portions 230 to permit the flow of water from one end of the reservoir to the other without splashing. The baffle 229 is furthermore disposed in an angular manner as in the preceding disclosures.

The steam iron 200 further includes a handle 230 and a spacer plate 231 which correspond closely to the handle 82 and the spacer plate 92 described heretofore. The handle 230 is provided at the front portion thereof with a cored chamber 233 for accommodating the steam dome 219. Concentrically disposed within the chamber 233 and surrounding the portion of reduced cross section of the steam dome 219 is a rotatable cam 234 which is adapted to rest on the shoulder 220. The rotatable cam 234 is adapted to be manipulated by a suitable control button 235 somewhat concentrically disposed with reference to the steam control button 218. As will become apparent from the following description, the button 235 is effectively a temperature control button and is substantially identical with the button 120 described above.

For the purpose of relating the cam 234 with suitable control means disposed within the control chamber 212, the cam 234 is provided with a spiral groove 238, around the periphery thereof for receiving a suitable cam follower 239 which is connected to a link 240. The upper end of the link 240 connected to the cam follower 239 is disposed within a vertical notch 241 opening into the cored chamber 233 so as to restrain the link 240 solely to vertical movement. The lower end of the link 240 extends through suitable openings in the spacer plate 231 and the reservoir 210 into the chamber 212.

For the purpose of controlling the temperature of the sole plate 201 there is disposed within the chamber 212 a bimetallic element 250 mounted in cantilever fashion within the well 34. One end of the bimetallic element 250 as illustrated is rigidly secured to the sole plate 201 as by means of a screw or the like 251. The other relatively free end of the bimetallic end 250 is adapted to engage a movable contact arm 252 comprising a flexible contact arm portion 252a to the free end of which is fashioned a U-shaped member 252b supporting at one end of the U a movable switch contact 253. When the sole plate 201 is heated up the bimetallic element 250 flexes in a direction to move the movable contact 253 in an upward direction as viewed in Fig. 19 of the drawings. The other end of the flexible conductor 252a not connected to the U-shaped member 252b is supported in a stack generally designated as 255 comprising insulating members and interposed conductors which stack corresponds to the stack 78 described above.

The movable contact 253 of the control switch is adapted to cooperate with a relatively stationary contact 256 mounted on a switch arm 257, one end of which is supported in the stack 255. The other end of the switch arm 257 is connected by means of an extension 257a with the lower end of the li :k 240. With this arrangement the position of the relatively stationary contact 256 may be varied in dependence upon the position of the control button 235 so as to require a selectively variable movement of the thermostat 250 to open the switch comprising the contacts 253 and 256 and consequently to provide selectively variable heating of the sole plate 201. As in the preceding figures the conductors within the stack 255 are suitably connected to the ends of the heating element 17 and also to the power supply cord by means of suitable conductors 260 and 261, which correspond respectively with the conductors 73 and 71 of the preceding figures. It will be understood that adjustment of the temperature control button 235 causes movement of the link 240 which together with the construction of the U-shaped portion 252b of the switch arm 252 requires a chamber 212 of substantially greater volume than the chamber 39 described heretofore. The larger chamber 212 means, of course, a smaller water capacity in the reservoir 210 for the same external configuration.

It should be understood that the steam iron 200 will be provided with a suitable combined safety valve and filler plug arrangement similar to those described above.

In view of the detailed description included above the operation of the steam iron 200 will be readily understood by those skilled in the art and no further discussion thereof is included herewith.

While there have been shown and described particular embodiments of the present invention, it will be apparent to those skilled in the art that various modifications may be made without departing from the invention in its broader aspects and it is therefore aimed in the appended claims to cover all such changes and modifications as fall within the true spirit and scope of the present invention.

What is desired to be secured by Letters Patent of the United States is:

1. A steam iron comprising a closed water reservoir, a steam generating chamber, a needle valve controlling the flow of water by gravity from said reservoir to said steam generating chamber, said valve comprising a valve seat and a cooperating elongated member with the valve means for controlling the flow of water being disposed at the end of the member cooperating with said seat, said member extending above said water reservoir to provide a manipulating member for said needle valve, means defining an elongated direct passageway interconnecting the upper portion of said water reservoir with said steam generating chamber, and means in said passageway for maintaining a pressure differential between said water reservoir and said steam generating chamber.

2. A steam iron comprising a closed water reservoir, a steam generating chamber, a needle valve controlling the flow of water by gravity from said reservoir to said steam generating chamber comprising an elongated member, said member extending above said water reservoir to provide a manipulating means for said needle valve, means defining an elongated direct passageway interconnecting the upper portion of said water reservoir with said steam generating chamber, and a valve member biased to the closed position disposed in said passageway for maintaining a pressure differential between said water reservoir and said steam generating chamber.

3. A steam iron comprising a closed water reservoir, a steam dome connected to and extending above said water reservoir, a steam generating chamber, a needle valve controlling the flow of water by gravity from said reservoir to said steam generating chamber, said needle valve comprising a manually movable valve member extending through said water reservoir and said steam dome, means associated with the upper end of said member for manual adjustment of said needle valve, means defining an elongated direct passageway to provide intercommunication between said steam dome and said steam generating chamber, and a valve means in said passageway to prevent said intercommunication until a predetermined pressure is produced in said reservoir.

4. A steam iron comprising a sole plate, a water reservoir, a steam generating chamber defined in said sole plate, a needle valve controlling the flow of water from said reservoir to said steam generating chamber, a handle for said iron comprising a hand grip portion extending in a direction generally parallel with the ironing surface of said sole plate, a first finger manipulating means in said handle at the upper forward part of said hand grip portion for controlling the temperature of said iron, and a second finger manipulating means in said handle disposed immediately adjacent said first finger manipulating means for controlling said needle valve, one of said finger manipulating means comprising an annular knob member with the other of said finger manipulating means concentrically arranged within the opening of said annular knob member.

5. A steam iron comprising a water reservoir, a steam generating chamber, a needle valve controlling the flow of water from said reservoir to said steam generating chamber, a handle for said iron, means including an annular knob disposed in a recess in the uppermost portion of said handle for selectively controlling the temperature of said iron, means including a second knob disposed within the opening in said annular knob for controlling said needle valve, and a single index mark formed on said handle adjacent said knobs for indicating the setting of each of said knobs.

6. A steam iron comprising a water reservoir, a steam generating chamber, valve means for controlling the flow of water from said reservoir to said steam generating chamber, a molded insulating handle for said iron having a cored opening at the front end, an annular knob disposed in a recess defined at the upper end of said cored opening for selectively controlling the temperature of said iron, means including a second knob disposed within the opening in said annular knob for controlling said needle valve, and control means extending within said cored opening connected to said annular knob, said control means being also connected to temperature responsive means included in said steam iron.

7. A pressing iron comprising a sole plate, a tubular member extending above said sole plate, the upper portion of said tubular member being of reduced diameter so as to define a circumferential ledge, thermostatic control means for said iron disposed in a well in said sole plate including movable means for adjusting the setting of said thermostatic control means, means for selectively controlling said thermostatic control means comprising an annular sleeve rotatably mounted about the upper portion of said tubular member and resting on said ledge, and means operatively interconnecting said annular member and said movable means.

8. A steam iron comprising a sole plate, a water reservoir disposed above said sole plate, a steam dome connected to and extending above said water reservoir, the upper portion of said steam dome being of reduced diameter so as to define a circumferential ledge, thermostatic control means for said iron disposed in a well in said sole plate including movable means for adjusting the setting of said thermostatic control means, means for selectively controlling said thermostatic control means comprising an annular cam member rotatably mounted about the upper portion of said steam dome and resting on said ledge, a cam follower associated with said cam member, and means interconnecting said cam follower and said movable means.

9. A steam iron comprising a sole plate, a water reservoir disposed above said sole plate in heat transfer relationship therewith, a tubular steam dome connected to and extending above said water reservoir with the axis of said steam dome disposed in a substantially vertical position when said iron is in its ironing position, the upper portion of said steam dome being of reduced diameter so as to define a circumferential ledge, a steam generating chamber defined in said sole plate, valve means controlling the flow of water from said reservoir to said steam generating chamber, thermostatic control means for said iron disposed in a chamber defined between said reservoir and said sole plate including movable means for adjusting the setting of said thermostatic control means, means for selectively controlling said thermostatic control means comprising an annular sleeve rotatably mounted about the upper portion of said steam dome and resting on said ledge, a cam surface formed on the outer circumference of said sleeve, a cam follower engageable with said cam surface and movable along said axis upon rotation of said sleeve, and means interconnecting said cam follower and said movable means.

10. A steam iron comprising a sole plate, a water reservoir disposed above said sole plate in heat transfer relationship therewith, a handle having an opening defined therein fastened to said reservoir, a tubular steam dome connected to and extending above said water reservoir into said opening in said handle with the axis of said steam dome disposed in a substantially vertical position when said iron is in its ironing position, the upper portion of said steam dome being of reduced diameter so as to define a circumferential ledge, a steam generating chamber defined in said sole plate, valve means controlling the flow of water from said reservoir to said steam generating chamber, thermostatic control means for said iron disposed in a chamber defined between said reservoir and said sole plate including movable means for adjusting the setting of said thermostatic control means, means for selectively controlling said thermostatic control means comprising an annular sleeve rotatably mounted about the upper portion of said steam dome in said opening in said handle and resting on said ledge, a cam surface formed on the outer circumference of said sleeve, a cam follower engageable with said cam surface and movable along said axis upon rotation of said sleeve, means defined in the walls of said opening for preventing rotational movement of said cam follower, and means interconnecting said cam follower and said movable means.

11. A steam iron comprising a sole plate, a water reservoir disposed above said sole plate in heat transfer relationship therewith, a tubular steam dome connected to and extending above said water reservoir with the axis of said steam dome disposed in a substantially vertical position when said iron is in its ironing position, the upper portion of said steam dome being of reduced diameter so as to define a circumferential ledge, a steam generating chamber defined in said sole plate, valve means controlling the flow of water from said reservoir to said steam generating chamber, thermostatic control means for said iron disposed in a chamber defined between said reservoir and said sole plate including movable means for adjusting the setting of said thermostatic control means, means for selectively controlling said thermostatic control means comprising an annular sleeve rotatably mounted about the upper portion of said steam dome and resting on said ledge, a cam surface formed on the outer circumference of said sleeve, a cam follower engageable with said cam surface and movable along said axis upon rotation of said sleeve, and a tension spring interconnecting said cam follower and said movable means whereby an adjustable spring force is applied to said thermostatic control means.

12. A steam iron comprising a sole plate, a water reservoir disposed above said sole plate in heat transfer relationship therewith, a tubular steam dome connected to and extending above said water reservoir with the axis of said steam dome disposed in a substantially vertical position when said iron is in its ironing position, the upper portion of said steam dome being of reduced diameter so as to define a circumferential ledge, a steam generating chamber defined in said sole plate, valve means controlling the flow of water from said reservoir to said steam generating chamber, thermostatic control means for said iron disposed in a chamber defined between said reservoir and said sole plate including movable means for adjusting the setting of said thermostatic control means, means for selectively controlling said thermostatic control means comprising an annular sleeve rotatably mounted about the upper portion of said steam dome and resting on said ledge, a cam surface formed on the outer circumference of said sleeve, a cam follower engageable with said cam surface and movable along said axis upon rotation of said sleeve, means interconnecting said cam follower and said movable means, an annular knob fastened to said sleeve for adjusting the heating of said sole plate, and a separate knob disposed in the opening in said annular knob for controlling the operating condition of said valve means.

13. A pressing iron comprising a sole plate, a control chamber of relatively small capacity disposed adjacent said sole plate, a thermostatic control means for said iron disposed in said chamber including a movable member having a rigid extension, movable means disposed outside of said chamber and capable of moving through a substantial distance, and energy storage means interconnecting said rigid extension and said movable means whereby a variable force may selectively be applied to said thermostatic control means to adjust the temperature of said sole plate while requiring little or no movement of said rigid member.

14. A pressing iron comprising a sole plate, a control chamber of minimum volume disposed adjacent said sole plate, a thermostatic control means for said iron disposed in said chamber including a movable member having a rigid extension, movable means disposed outside of said chamber and capable of moving through a substantial distance, and a tension spring interconnecting said rigid extension and said movable means whereby a variable force may selectively be applied to said thermostatic control means to adjust the temperature of said sole plate.

15. A steam iron comprising a sole plate, a water reservoir associated with said sole plate, a control chamber of minimum volume disposed between said reservoir and said sole plate, a thermostatic control means for said iron disposed in said chamber including a movable member having a rigid extension, manually movable means disposed outside of said chamber and capable of moving through a substantial distance, and a tension spring interconnecting said rigid extension and said movable means whereby a variable force may selectively be applied to said thermostatic control means to adjust the temperature of said sole plate while requiring a minimum of movement of said rigid member thereby permitting space otherwise required for said chamber to be included in said water reservoir.

16. A steam iron comprising a sole plate, a water reservoir, a steam generating chamber defined in said sole plate, valve means for controlling the flow of water from said reservoir to said steam generating chamber, a molded insulating handle for said iron having a cored opening at the front end, means for securing said handle to said sole plate, means including a manual control knob pivotal about an axis perpendicular to said sole plate and disposed at the upper end of said cored opening for selectively controlling the temperature of said iron, means including a second manual control means disposed above and adjacent to said first manual control knob for controlling said valve means, temperature responsive means disposed between said water reservoir and said sole plate, and control means extending within said cored opening for operatively interconnecting said temperature responsive control means and said manual control knob.

17. A steam iron comprising a sole plate, a water reservoir, a steam generating chamber defined in said sole plate, valve means for controlling the flow of water from said reservoir to said steam generating chamber, a molded insulating handle for said iron having a cored opening at the front end, means for securing said handle to said sole plate, means including a manual control knob pivotal about an axis perpendicular to said sole plate and disposed at the upper end of said cored opening for selectively controlling the temperature of said iron, means including a second manual control means disposed above and adjacent to said first manual control knob for controlling said valve means, temperature responsive means disposed between said water reservoir and said sole plate, control means extending within said cored opening for operatively interconnecting said temperature responsive control means and said manual control knob, and a filler opening in said handle connected to said water reservoir.

18. A steam iron comprising a sole plate, a water reservoir, a steam generating chamber defined in said sole plate, valve means for controlling the flow of water from said reservoir to said steam generating chamber, a molded insulating handle for said iron having a cored opening at the front end extending in a generally vertical direction, said handle also including a hand grip portion disposed in a position generally parallel with the ironing surface of said sole plate, means for securing said handle to said sole plate, means including a manual control knob *disposed adjacent the upper portion of said handle and* pivotal about an axis perpendicular to said sole plate for selectively controlling the temperature of said iron, means including a second manual control means disposed adjacent the upper end of said cored opening [and disposed] above said [first] manual control knob and on a level with the hand grip portion of said handle for controlling said valve means, temperature responsive means disposed between said water reservoir and said sole plate, [and control means] *an elongated link having a substantial portion thereof disposed within said cored opening* for operatively interconnecting said temperature responsive control means and said manual control knob, *and cam means associated with one end of said link.*

19. The steam iron of claim 18 in which a [filter] *filler* opening for said reservoir is provided in said handle.

20. A steam iron comprising a sole plate, a water reservoir, a steam generating chamber defined in said sole plate, a molded insulating handle for said iron having a cored opening at the front end, means for securing said handle to said sole plate, means including a manual control knob pivotal about an axis perpendicular to said sole plate and disposed at the upper end of said cored opening for selectively controlling the temperature of said iron, a control chamber of relatively small capacity disposed between said reservoir and said sole plate, thermostatic control means for said iron disposed in said chamber, including a movable member having an extension, and movable means extending within said cored opening for operatively interconnecting said extension and said manual control knob.

21. A steam iron comprising a sole plate, a water reservoir, a steam generating chamber defined in said sole plate, valve means for controlling the flow of water from said reservoir to said steam generating chamber, a tubular steam dome fixed to said reservoir, said steam dome extending up from said reservoir when the steam iron is in its normal ironing position, a handle on said iron secured to said sole plate, said handle having a bore located therein and said steam dome being received in said bore, means defining a passageway through said handle connected to said reservoir and forming a filling opening for said reservoir, a heel rest upon which the iron may be tiled back from its normal ironing position, and manular control means extending through said steam dome and terminating in a finger actuated member for adjusting the rate of flow of water through said valve means to said steam generating chamber.

*22. A steam iron comprising a sole plate, a water reservoir, a steam generating chamber defined in said sole plate, valve means for controlling the flow of water from said reservoir to said steam generating chamber, a tubular member fixed to said reservoir, said tubular member extending up from said reservoir when the steam iron is in its normal ironing position, a handle on said iron secured to said sole plate, said handle having a bore located therein and said tubular member being received in said bore, means defining a passageway through said handle connected to said reservoir and forming a filling opening for said reservoir, a heel rest upon which the iron may be tilted back from its normal ironing position, manual control means extending through said tubular member along the longitudinal axis thereof and terminating adjacent the top of said handle in a first finger actuated member for controlling the flow of water through said valve means to said steam generating chamber, a second finger actuated member disposed near the upper portion of said handle adjacent said first finger actuated member, temperature responsive means disposed between said water reservoir and said sole plate responsive to the temperature of said sole plate, and control means extending within said bore but outside said tubular member for operatively interconnecting said second finger actuated member and said temperature responsive means.*

*23. The steam iron of claim 18 in which an elongated direct passageway interconnects said steam generating chamber with the upper portion of said water reservoir.*

*24. The steam iron of claim 22 wherein there is provided means defining an elongated passageway interconnecting said steam generating chamber with the interior of said tubular member.*

*25. The steam iron of claim 18 in which a filler opening is provided in said reservoir and in which closure means are provided for said filler opening.*

References Cited in the file of this patent or the original patent

UNITED STATES PATENTS

| | | |
|---|---|---|
| 2,178,512 | Schreyer | Oct. 31, 1939 |
| 2,190,412 | McMurry | Feb. 13, 1940 |
| 2,277,034 | Bisley | Mar. 24, 1942 |
| 2,277,439 | Jepson | Mar. 24, 1942 |
| 2,279,215 | Theilgaard | Apr. 7, 1942 |
| 2,288,517 | Dubilier | June 30, 1942 |
| 2,295,341 | Finlayson | Sept. 8, 1942 |
| 2,316,907 | Wallace | Apr. 20, 1943 |
| 2,317,706 | Woodman | Apr. 27, 1943 |
| 2,322,593 | Riddington et al. | June 22, 1943 |
| 2,328,124 | Bremer | Aug. 31, 1943 |
| 2,342,653 | Edwards | Feb. 29, 1944 |
| 2,342,716 | Woodman | Feb. 29, 1944 |
| 2,353,426 | Morton | July 11, 1944 |
| 2,387,281 | Morton | Oct. 23, 1945 |
| 2,387,757 | Hoecker | Oct. 30, 1945 |
| 2,415,795 | Koci | Feb. 11, 1947 |
| 2,427,521 | Butman | Sept. 16, 1947 |
| 2,441,586 | Norton | May 18, 1948 |
| 2,618,875 | Vieceli | Nov. 25, 1952 |